United States Patent
Kim et al.

(10) Patent No.: US 10,635,915 B1
(45) Date of Patent: Apr. 28, 2020

(54) METHOD AND DEVICE FOR WARNING BLIND SPOT COOPERATIVELY BASED ON V2V COMMUNICATION WITH FAULT TOLERANCE AND FLUCTUATION ROBUSTNESS IN EXTREME SITUATION

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/723,598

(22) Filed: Dec. 20, 2019

Related U.S. Application Data

(60) Provisional application No. 62/798,731, filed on Jan. 30, 2019.

(51) Int. Cl.
*G06K 9/00* (2006.01)
*G06N 3/08* (2006.01)
(Continued)

(52) U.S. Cl.
CPC .......... *G06K 9/00825* (2013.01); *B60Q 9/00* (2013.01); *B60R 11/04* (2013.01);
(Continued)

(58) Field of Classification Search
CPC .......... G06K 9/00825; G06K 9/00718; G06K 9/6267; H04W 4/46; B60Q 9/00;
(Continued)

(56) References Cited

U.S. PATENT DOCUMENTS

| 2019/0072977 A1* | 3/2019 | Jeon | G06K 9/00791 |
| 2019/0266489 A1* | 8/2019 | Hu | B60W 10/20 |
| 2020/0008028 A1* | 1/2020 | Yang | H04W 4/44 |

* cited by examiner

*Primary Examiner* — Omer S Khan
(74) *Attorney, Agent, or Firm* — Kaplan Breyer Schwarz, LLP

(57) ABSTRACT

A method for giving a warning on a blind spot of a vehicle based on V2V communication is provided. The method includes steps of: (a) if a rear video of a first vehicle is acquired from a rear camera, a first blind-spot warning device transmitting the rear video to a blind-spot monitor, to determine whether nearby vehicles are in the rear video using a CNN, and output first blind-spot monitoring information of determining whether the nearby vehicles are in a blind spot; and (b) if second blind-spot monitoring information of determining whether a second vehicle is in the blind spot, is acquired from a second blind-spot warning device of the second vehicle, over the V2V communication, the first blind-spot warning device warning that one of the second vehicle and the nearby vehicles is in the blind spot by referring to the first and the second blind-spot monitoring information.

22 Claims, 7 Drawing Sheets

(51) Int. Cl.
  *G06K 9/62* (2006.01)
  *H04W 4/46* (2018.01)
  *B60R 11/04* (2006.01)
  *B60Q 9/00* (2006.01)
(52) U.S. Cl.
  CPC ....... *G06K 9/00718* (2013.01); *G06K 9/6267* (2013.01); *G06N 3/084* (2013.01); *H04W 4/46* (2018.02); *B60R 2300/802* (2013.01); *B60R 2300/8066* (2013.01)
(58) Field of Classification Search
  CPC ............... B60R 11/04; B60R 2300/802; B60R 2300/8066; G06N 3/084
  See application file for complete search history.

METHOD AND DEVICE FOR WARNING BLIND SPOT COOPERATIVELY BASED ON V2V COMMUNICATION WITH FAULT TOLERANCE AND FLUCTUATION ROBUSTNESS IN EXTREME SITUATION

CROSS REFERENCE TO RELATED APPLICATION

This application claims the benefit of priority to U.S. Provisional Patent Application No. 62/798,731, filed on Jan. 30, 2019, the entire contents of which are incorporated herein by reference.

FIELD OF THE DISCLOSURE

The present disclosure relates to a warning system on blind spots of a vehicle; and more particularly, to the warning system on the blind spots via cooperation with nearby vehicles based on V2V communication.

BACKGROUND OF THE DISCLOSURE

A monitoring vehicle has a side view mirror for each side thereof and a rear-view mirror at the front center of its cabin for a good field of view of the side and the rear needed for change of lanes by a driver.

Although the side view mirror is used for seeing each side and the rear thereof, it has a blind spot where the driver cannot see a monitored vehicle or any other objects that are very close thereto.

This has been a problem because there can be an accident with the monitored vehicle in the blind spot if the driver changes lanes without seeing the monitored vehicle.

To prevent such a problem, the driver sometimes put a convex mirror onto a corner of the side view mirror, which enables the driver to see the blind spot.

However, even when the convex mirror is added onto the side view mirror, the driver must see the blind spot with his/her own eyes to change lanes which puts further strain to the driver, and there may exist the blind spot that still cannot be seen through the convex mirror even if the driver alters his/her head position.

To prevent this, a conventional blind-spot warning system was suggested that aims to prevent accidents from happening when the driver changes lanes without noticing the monitored vehicle in the blind spot, by providing the driver with information on a detection of the monitored vehicle, that is located in the blind spot or approaching the blind spot, through a sensor placed at the rear of the monitoring vehicle.

Especially, the conventional blind-spot warning system using a vision sensor may detect monitored vehicles included in video information and determine whether the monitored vehicles are on the blind spots by using information on the detected monitored vehicles.

Recently, a new blind-spot warning system in which position information of vehicles is shared by V2V communication has been proposed.

However, in the conventional blind-spot warning system, there is a problem that an accurate blind-spot warning cannot be provided when the vehicles are between tall buildings where position accuracy deteriorates, or in driving conditions such as cloudy weather, tunnel, etc., while the position information of the vehicles using GPS is shared by the V2V communication.

Further, in the conventional blind-spot warning system, there is a problem in that the accurate blind-spot warning cannot be provided when the lens of the rear camera installed at the rear of the vehicle is contaminated with water-drops or the like.

In addition, in the conventional blind-spot warning system, there is a problem that the blind-spot warning cannot be provided because object detection performance based on an image of the rear camera is low during nighttime driving in low illumination.

SUMMARY OF THE DISCLOSURE

It is an object of the present disclosure to solve all the aforementioned problems.

It is another object of the present disclosure to allow at least one blind-spot warning by using V2V (vehicle to vehicle) communication without regard to driving environment.

It is still another object of the present disclosure to allow the blind-spot warning even if at least one lens of at least one rear camera of a vehicle is contaminated.

It is still yet another object of the present disclosure to allow the blind-spot warning even in nighttime.

In accordance with one aspect of the present disclosure, there is provided a method for giving a warning on a blind spot of a vehicle based on vehicle to vehicle communication, including steps of: (a) if a rear video of a first vehicle is acquired from a rear camera monitoring a rear area of the first vehicle, a first blind-spot warning device of the first vehicle performing a process of transmitting the rear video of the first vehicle to a blind-spot monitor, to thereby allow the blind-spot monitor to determine whether one or more nearby vehicles are shown in the rear video of the first vehicle by analyzing the rear video of the first vehicle based on a convolutional neural network, and thus to output first blind-spot monitoring information which is a result of determining whether at least one of the nearby vehicles shown in the rear video of the first vehicle is located in a first blind spot of the first vehicle; and (b) if second blind-spot monitoring information, which is a result of determining whether a second vehicle is located in the first blind spot of the first vehicle, is acquired from a second blind-spot warning device of the second vehicle located in the rear area of the first vehicle, over the vehicle to vehicle communication, the first blind-spot warning device performing a process of giving a warning that at least one of the second vehicle and the nearby vehicles is located in the first blind spot by referring to the first blind-spot monitoring information and the second blind-spot monitoring information.

As one example, the method further includes a step of: (c) if a first front video of the first vehicle is acquired from a first front camera monitoring a front area of the first vehicle, the first blind-spot warning device performing a process of transmitting the first front video to a first detector of the first vehicle, to thereby allow the first detector to detect a third vehicle located in the front area of the first vehicle by analyzing the first front video based on the convolutional neural network, and thus to transmit third blind-spot monitoring information, which is a result of determining whether the first vehicle is located in a third blind spot of the detected third vehicle, to the third vehicle over the vehicle to vehicle communication.

As one example, the first blind-spot warning device performs a process of transmitting the first front video to the first detector to allow the first detector to (i) input the first front video into a first convolutional layer, to thereby allow the first convolutional layer to generate a first front video feature map by applying convolution operation to the first front video, (ii) input the first front video feature map into a first region proposal network, to thereby allow the first region proposal network to generate first proposal boxes corresponding to first objects on the first front video feature map, (iii) input the first front video feature map into a first pooling layer, to thereby allow the first pooling layer to generate a first front video feature vector by applying pooling operation to one or more regions, corresponding to the first proposal boxes, on the first front video feature map, (iv) input the first front video feature vector into a first fully connected layer, to thereby allow the first fully connected layer to apply fully-connected operation to the first front video feature vector, and (v) input an output from the first fully connected layer respectively into a first classification layer and a first regression layer, to thereby allow the first classification layer and the first regression layer to respectively output first class information and first regression information on each of the first objects corresponding to each of the first proposal boxes, and thus to detect the third vehicle located in the first front video by referring to the first class information and the first regression information on each of the first objects.

As one example, the first detector has been learned by a learning device performing (i) a process of inputting a training image into the first convolutional layer, to thereby allow the first convolutional layer to generate at least one feature map for training by applying convolution operation to the training image, (ii) a process of inputting the feature map for training into the first region proposal network, to thereby allow the first region proposal network to generate one or more proposal boxes for training corresponding to one or more objects for training on the feature map for training, (iii) a process of inputting the feature map for training into the first pooling layer, to thereby allow the first pooling layer to generate a feature vector for training by applying pooling operation to one or more regions, corresponding to the proposal boxes for training, on the feature map for training, (iv) a process of inputting the feature vector for training into the first fully connected layer, to thereby allow the first fully connected layer to apply fully-connected operation to the feature vector for training, (v) a process of inputting at least one output for training from the first fully connected layer respectively into the first classification layer and the first regression layer, to thereby allow the first classification layer and the first regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the first fully connected layer and the first convolutional layer by backpropagating the losses.

As one example, the first blind-spot warning device performs a process of determining whether the first vehicle is located in the third blind spot by referring to a longitudinal distance and a lateral distance between the first vehicle and the third vehicle.

As one example, the first blind-spot warning device further performs a process of transmitting GPS location information on the first vehicle to the third vehicle over the vehicle to vehicle communication.

As one example, at the step of (a), the first blind-spot warning device performs a process of transmitting the rear video to the blind-spot monitor to allow the blind-spot monitor to (i) input the rear video into a second convolutional layer, to thereby allow the second convolutional layer to generate a rear video feature map by applying convolution operation to the rear video, (ii) input the rear video feature map into a second region proposal network, to thereby allow the second region proposal network to generate second proposal boxes corresponding to second objects on the rear video feature map, (iii) input the rear video feature map into a second pooling layer, to thereby allow the second pooling layer to generate a rear video feature vector by applying pooling operation to one or more regions, corresponding to the second proposal boxes, on the rear video feature map, (iv) input the rear video feature vector into a second fully connected layer, to thereby allow the second fully connected layer to apply fully-connected operation to the rear video feature vector, and (v) input an output from the second fully connected layer respectively into a second classification layer and a second regression layer, to thereby allow the second classification layer and the second regression layer to respectively output second class information and second regression information on each of the second objects corresponding to each of the second proposal boxes, and thus to detect the nearby vehicles located in the rear video by referring to the second class information and the second regression information on each of the second objects.

As one example, the blind-spot monitor has been learned by a learning device performing (i) a process of inputting a training image into the second convolutional layer, to thereby allow the second convolutional layer to generate a feature map for training by applying convolution operation to the training image, (ii) a process of inputting the feature map for training into the second region proposal network, to thereby allow the second region proposal network to generate proposal boxes for training corresponding to objects for training on the feature map for training, (iii) a process of inputting the feature map for training into the second pooling layer, to thereby allow the second pooling layer to generate a feature vector for training by applying pooling operation to one or more regions, corresponding to proposal boxes for training, on the feature map for training, (iv) a process of inputting the feature vector for training into the second fully connected layer, to thereby allow the second fully connected layer to apply fully-connected operation to the feature vector for training, (v) a process of inputting an output for training from the second fully connected layer respectively into the second classification layer and the second regression layer, to thereby allow the second classification layer and the second regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the second fully connected layer and the second convolutional layer by backpropagating the losses.

As one example, at the step of (a), the first blind-spot warning device performs a process of transmitting the rear video to the blind-spot monitor, to thereby allow the blind-spot monitor to determine whether the nearby vehicles are located in the first blind spot by referring to longitudinal distances and lateral distances between the first vehicle and each of the nearby vehicles detected.

As one example, at the step of (b), the first blind-spot warning device performs a process of giving a warning that at least one of the second vehicle and the nearby vehicles is located in the first blind spot by referring to at least part of the first blind-spot monitoring information and the second blind-spot monitoring information, in response to driving environment information on the first vehicle.

As one example, at the step of (b), the first blind-spot warning device performs a process of acquiring GPS location information on the second vehicle from the second blind-spot warning device over the vehicle to vehicle communication, wherein, if a GPS confidence value of the GPS location information on the second vehicle is determined as valid, the first blind-spot warning device performs a process of giving a warning that the second vehicle is located in the first blind spot through determining whether the second vehicle is located in the first blind spot by referring to the GPS location information on the second vehicle, and wherein, if the GPS confidence value of the GPS location information on the second vehicle is determined as not valid, the first blind-spot warning device performs a process of giving a warning that at least one of the second vehicle and the nearby vehicles is located in the first blind spot by referring to the first blind-spot monitoring information and the second blind-spot monitoring information.

As one example, at the step of (b), the second blind-spot warning device performs a process of transmitting a second front video, acquired from a second front camera monitoring a front area of the second vehicle, to a second detector of the second vehicle to allow the second detector to (i) input the second front video into a third convolutional layer, to thereby allow the third convolutional layer to generate a second front video feature map by applying convolution operation to the second front video, (ii) input the second front video feature map into a third region proposal network, to thereby allow the third region proposal network to generate third proposal boxes corresponding to third objects on the second front video feature map, (iii) input the second front video feature map into a third pooling layer, to thereby allow the third pooling layer to generate a second front video feature vector by applying pooling operation to one or more regions, corresponding to the third proposal boxes, on the second front video feature map, (iv) input the second front video feature vector into a third fully connected layer, to thereby allow the third fully connected layer to apply fully-connected operation to the second front video feature vector, and (v) input an output from the third fully connected layer respectively into a third classification layer and a third regression layer, to thereby allow the third classification layer and the third regression layer to respectively output third class information and third regression information on each of the third objects corresponding to each of the third proposal boxes, and thus to detect the first vehicle located in the second front video by referring to the third class information and the third regression information on each of the third objects, and as a result, a process of generating the second blind-spot monitoring information representing whether the second vehicle is located in the first blind spot of the detected first vehicle.

As one example, the second detector has been learned by a learning device performing (i) a process of inputting a training image into the third convolutional layer, to thereby allow the third convolutional layer to generate a feature map for training by applying convolution operation to the training image, (ii) a process of inputting the feature map for training into the third region proposal network, to thereby allow the third region proposal network to generate proposal boxes for training corresponding to objects for training on the feature map for training, (iii) a process of inputting the feature map for training into the third pooling layer, to thereby allow the third pooling layer to generate a feature vector for training by applying pooling operation to one or more regions, corresponding to proposal boxes for training, on the feature map for training, (iv) a process of inputting the feature vector for training into the third fully connected layer, to thereby allow the third fully connected layer to apply fully-connected operation to the feature vector for training, (v) a process of inputting an output for training from the third fully connected layer respectively into the third classification layer and the third regression layer, to thereby allow the third classification layer and the third regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the third fully connected layer and the third convolutional layer by back-propagating the losses.

In accordance with another aspect of the present disclosure, there is provided a first blind-spot warning device of a first vehicle for giving a warning on a blind spot of a vehicle based on vehicle to vehicle communication, including: at least one memory that stores instructions; and at least one processor configured to execute the instructions to perform or support another device to perform: (I) if a rear video of the first vehicle is acquired from a rear camera monitoring a rear area of the first vehicle, a process of transmitting the rear video of the first vehicle to a blind-spot monitor, to thereby allow the blind-spot monitor to determine whether one or more nearby vehicles are shown in the rear video of the first vehicle by analyzing the rear video of the first vehicle based on a convolutional neural network, and thus to output first blind-spot monitoring information which is a result of determining whether at least one of the nearby vehicles shown in the rear video of the first vehicle is located in a first blind spot of the first vehicle; and (II) if second blind-spot monitoring information, which is a result of determining whether a second vehicle is located in the first blind spot of the first vehicle, is acquired from a second blind-spot warning device of the second vehicle located in the rear area of the first vehicle, over the vehicle to vehicle communication, a process of giving a warning that at least one of the second vehicle and the nearby vehicles is located in the first blind spot by referring to the first blind-spot monitoring information and the second blind-spot monitoring information.

As one example, the processor further performs: (c) if a first front video of the first vehicle is acquired from a first front camera monitoring a front area of the first vehicle, a process of transmitting the first front video to a first detector of the first vehicle, to thereby allow the first detector to detect a third vehicle located in the front area of the first vehicle by analyzing the first front video based on the convolutional neural network, and thus to transmit third blind-spot monitoring information, which is a result of determining whether the first vehicle is located in a third blind spot of the detected third vehicle, to the third vehicle over the vehicle to vehicle communication.

As one example, the processor performs a process of transmitting the first front video to the first detector to allow the first detector to (i) input the first front video into a first convolutional layer, to thereby allow the first convolutional layer to generate a first front video feature map by applying convolution operation to the first front video, (ii) input the first front video feature map into a first region proposal network, to thereby allow the first region proposal network to generate first proposal boxes corresponding to first objects on the first front video feature map, (iii) input the first front video feature map into a first pooling layer, to thereby allow the first pooling layer to generate a first front video feature vector by applying pooling operation to one or more regions, corresponding to the first proposal boxes, on the first front video feature map, (iv) input the first front video feature vector into a first fully connected layer, to thereby allow the first fully connected layer to apply fully-connected operation to the first front video feature vector, and (v) input an output from the first fully connected layer respectively into a first classification layer and a first regression layer, to thereby allow the first classification layer and the first regression layer to respectively output first class information and first regression information on each of the first objects corresponding to each of the first proposal boxes, and thus to detect the third vehicle located in the first front video by referring to the first class information and the first regression information on each of the first objects.

As one example, the first detector has been learned by a learning device performing (i) a process of inputting a training image into the first convolutional layer, to thereby allow the first convolutional layer to generate at least one feature map for training by applying convolution operation to the training image, (ii) a process of inputting the feature map for training into the first region proposal network, to thereby allow the first region proposal network to generate one or more proposal boxes for training corresponding to one or more objects for training on the feature map for training, (iii) a process of inputting the feature map for training into the first pooling layer, to thereby allow the first pooling layer to generate at least one feature vector for training by applying pooling operation to one or more regions, corresponding to the proposal boxes for training, on the feature map for training, (iv) a process of inputting the feature vector for training into the first fully connected layer, to thereby allow the first fully connected layer to apply fully-connected operation to the feature vector for training, (v) a process of inputting at least one output for training from the first fully connected layer respectively into the first classification layer and the first regression layer, to thereby allow the first classification layer and the first regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the first fully connected layer and the first convolutional layer by backpropagating the losses.

As one example, the processor performs a process of determining whether the first vehicle is located in the third blind spot by referring to a longitudinal distance and a lateral distance between the first vehicle and the third vehicle.

As one example, the processor further performs a process of transmitting GPS location information on the first vehicle to the third vehicle over the vehicle to vehicle communication.

As one example, at the process of (I), the processor performs a process of transmitting the rear video to the blind-spot monitor to allow the blind-spot monitor to (i) input the rear video into a second convolutional layer, to thereby allow the second convolutional layer to generate a rear video feature map by applying convolution operation to the rear video, (ii) input the rear video feature map into a second region proposal network, to thereby allow the second region proposal network to generate second proposal boxes corresponding to second objects on the rear video feature map, (iii) input the rear video feature map into a second pooling layer, to thereby allow the second pooling layer to generate a rear video feature vector by applying pooling operation to one or more regions, corresponding to the second proposal boxes, on the rear video feature map, (iv) input the rear video feature vector into a second fully connected layer, to thereby allow the second fully connected layer to apply fully-connected operation to the rear video feature vector, and (v) input an output from the second fully connected layer respectively into a second classification layer and a second regression layer, to thereby allow the second classification layer and the second regression layer to respectively output second class information and second regression information on each of the second objects corresponding to each of the second proposal boxes, and thus to detect the nearby vehicles located in the rear video by referring to the second class information and the second regression information on each of the second objects.

As one example, the blind-spot monitor has been learned by a learning device performing (i) a process of inputting a training image into the second convolutional layer, to thereby allow the second convolutional layer to generate a feature map for training by applying convolution operation to the training image, (ii) a process of inputting the feature map for training into the second region proposal network, to thereby allow the second region proposal network to generate proposal boxes for training corresponding to objects for training on the feature map for training, (iii) a process of inputting the feature map for training into the second pooling layer, to thereby allow the second pooling layer to generate a feature vector for training by applying pooling operation to one or more regions, corresponding to proposal boxes for training, on the feature map for training, (iv) a process of inputting the feature vector for training into the second fully connected layer, to thereby allow the second fully connected layer to apply fully-connected operation to the feature vector for training, (v) a process of inputting an output for training from the second fully connected layer respectively into the second classification layer and the second regression layer, to thereby allow the second classification layer and the second regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the second fully connected layer and the second convolutional layer by backpropagating the losses.

As one example, at the process of (I), the processor performs a process of transmitting the rear video to the blind-spot monitor, to thereby allow the blind-spot monitor to determine whether the nearby vehicles are located in the first blind spot by referring to longitudinal distances and lateral distances between the first vehicle and each of the nearby vehicles detected.

As one example, at the process of (II), the processor performs a process of giving a warning that at least one of the second vehicle and the nearby vehicles is located in the first blind spot by referring to at least part of the first blind-spot monitoring information and the second blind-spot monitoring information, in response to driving environment information on the first vehicle.

As one example, at the process of (II), the processor performs a process of acquiring GPS location information on the second vehicle from the second blind-spot warning device over the vehicle to vehicle communication, wherein, if a GPS confidence value of the GPS location information on the second vehicle is determined as valid, the processor performs a process of giving a warning that the second vehicle is located in the first blind spot through determining whether the second vehicle is located in the first blind spot by referring to the GPS location information on the second vehicle, and wherein, if the GPS confidence value of the GPS location information on the second vehicle is determined as not valid, the processor performs a process of giving a warning that at least one of the second vehicle and the nearby vehicles is located in the first blind spot by referring to the first blind-spot monitoring information and the second blind-spot monitoring information.

As one example, at the process of (II), the second blind-spot warning device performs a process of transmitting a second front video, acquired from a second front camera monitoring a front area of the second vehicle, to a second detector of the second vehicle to allow the second detector to (i) input the second front video into a third convolutional layer, to thereby allow the third convolutional layer to generate a second front video feature map by applying convolution operation to the second front video, (ii) input the second front video feature map into a third region proposal network, to thereby allow the third region proposal network to generate third proposal boxes corresponding to third objects on the second front video feature map, (iii) input the second front video feature map into a third pooling layer, to thereby allow the third pooling layer to generate a second front video feature vector by applying pooling operation to one or more regions, corresponding to the third proposal boxes, on the second front video feature map, (iv) input the second front video feature vector into a third fully connected layer, to thereby allow the third fully connected layer to apply fully-connected operation to the second front video feature vector, and (v) input an output from the third fully connected layer respectively into a third classification layer and a third regression layer, to thereby allow the third classification layer and the third regression layer to respectively output third class information and third regression information on each of the third objects corresponding to each of the third proposal boxes, and thus to detect the first vehicle located in the second front video by referring to the third class information and the third regression information on each of the third objects, and as a result, a process of generating the second blind-spot monitoring information representing whether the second vehicle is located in the first blind spot of the detected first vehicle.

As one example, the second detector has been learned by a learning device performing (i) a process of inputting a training image into the third convolutional layer, to thereby allow the third convolutional layer to generate a feature map for training by applying convolution operation to the training image, (ii) a process of inputting the feature map for training into the third region proposal network, to thereby allow the third region proposal network to generate proposal boxes for training corresponding to objects for training on the feature map for training, (iii) a process of inputting the feature map for training into the third pooling layer, to thereby allow the third pooling layer to generate a feature vector for training by applying pooling operation to one or more regions, corresponding to proposal boxes for training, on the feature map for training, (iv) a process of inputting the feature vector for training into the third fully connected layer, to thereby allow the third fully connected layer to apply fully-connected operation to the feature vector for training, (v) a process of inputting an output for training from the third fully connected layer respectively into the third classification layer and the third regression layer, to thereby allow the third classification layer and the third regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the third fully connected layer and the third convolutional layer by back-propagating the losses.

In addition, recordable media readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
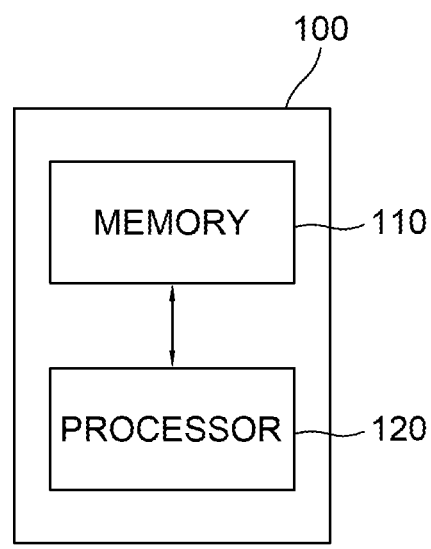
FIG. 1 is a drawing schematically illustrating a blind-spot warning device, which is fluctuation-robust and fault-tolerant in an extreme situation, to give a warning on at least one blind spot by cooperation with nearby vehicles based on V2V (vehicle to vehicle) communication in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating at least one blind-spot warning device, which is fluctuation-robust and fault-tolerant in an extreme situation, for giving at least one warning on a blind spot by cooperation with nearby vehicles based on V2V (vehicle to vehicle) communication in accordance with one example embodiment of the present disclosure. By referring to FIG. 1, the blind-spot warning device 100 may include a memory 110 for storing instructions to give the warning on the blind spot, which is fluctuation-robust and fault-tolerant in the extreme situation by cooperation with the nearby vehicles based on the V2V communication, and a processor 120 for performing processes corresponding to the instructions in the memory 110 to give the warning on the blind spot which is fluctuation-robust and fault-tolerant in the extreme situation by cooperation with the nearby vehicles based on the V2V communication.

Specifically, the blind-spot warning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for giving the blind-spot warning which is fluctuation-robust and fault-tolerant in the extreme situation by cooperation with the nearby vehicles based on the V2V communication by using the blind-spot warning device 100 in accordance with one example embodiment of the present disclosure is described by referring to FIGS. 2 to 5.

Figure 2:
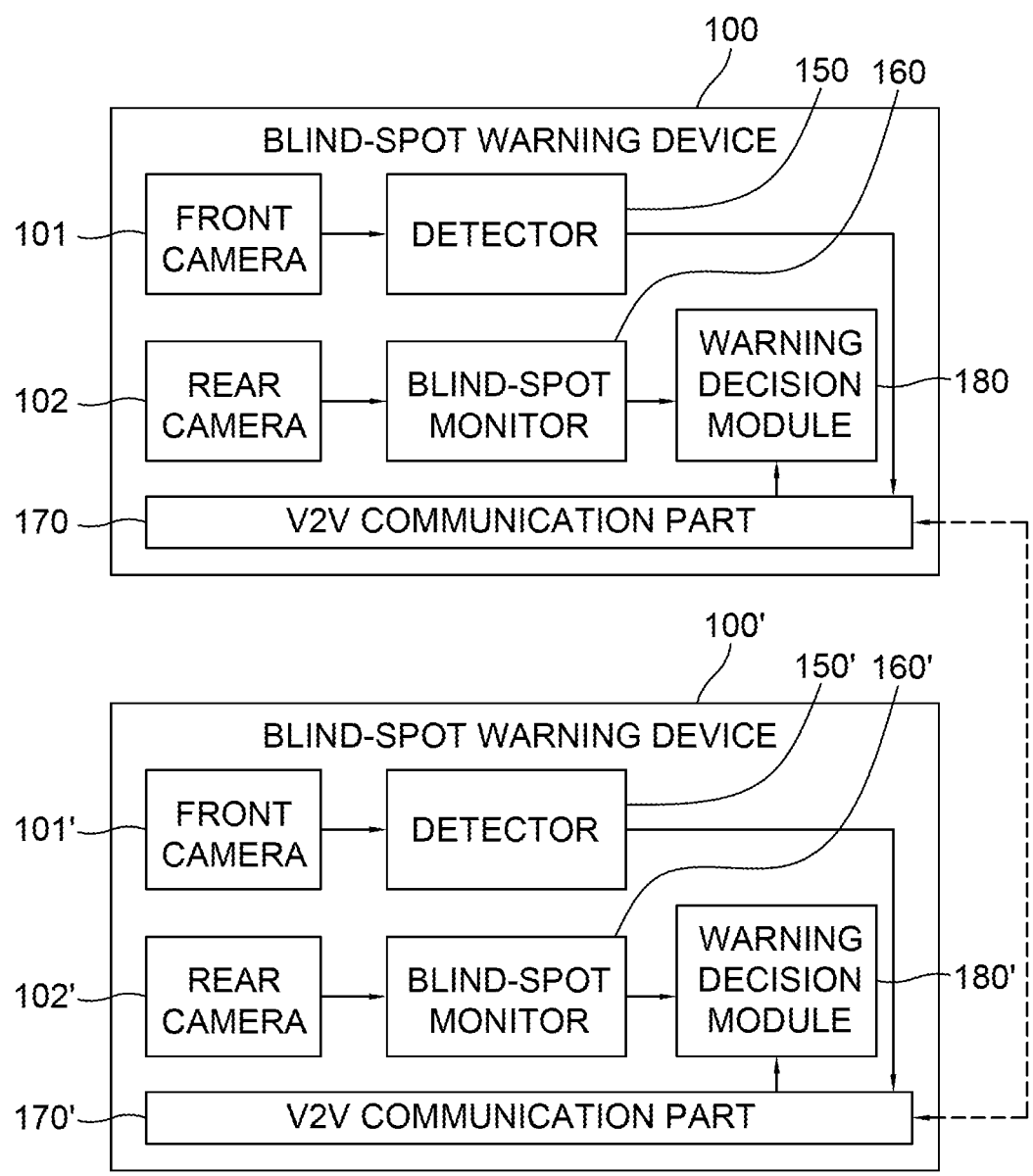
FIG. 2 is a drawing schematically illustrating each of vehicles with its blind-spot warning device, which is fluctuation-robust and fault-tolerant in the extreme situation, to give a warning on the blind spot by cooperation with the nearby vehicles based on the V2V communication in accordance with one example embodiment of the present disclosure.

First, by referring to FIG. 2, each of the blind-spot warning devices 100 and 100' is installed on each of the vehicles, and each of the blind-spot warning devices 100 and 100' may respectively include each detector 150 and 150' for detecting the nearby vehicles on at least one front image respectively acquired from at least one each front camera 101 and 101' and may respectively include at least one each blind-spot monitor 160 and 160' for detecting blind spots on at least one rear image respectively acquired from at least one each rear camera 102 and 102'.

Also, each of the blind-spot warning devices 100 and 100' may respectively include (i) each V2V communication part 170 and 170' for transmitting and receiving driving information of each of the vehicles and vehicle information on the vehicles respectively detected by the detector 150 and 150', and (ii) each warning decision module 180 and 180' for determining whether to output the warning on the blind spot by respectively referring to blind-spot monitoring information from the blind-spot monitor 160 and 160' and the driving information of the nearby vehicles respectively received via the V2V communication part 170 and 170'.

Figure 3:
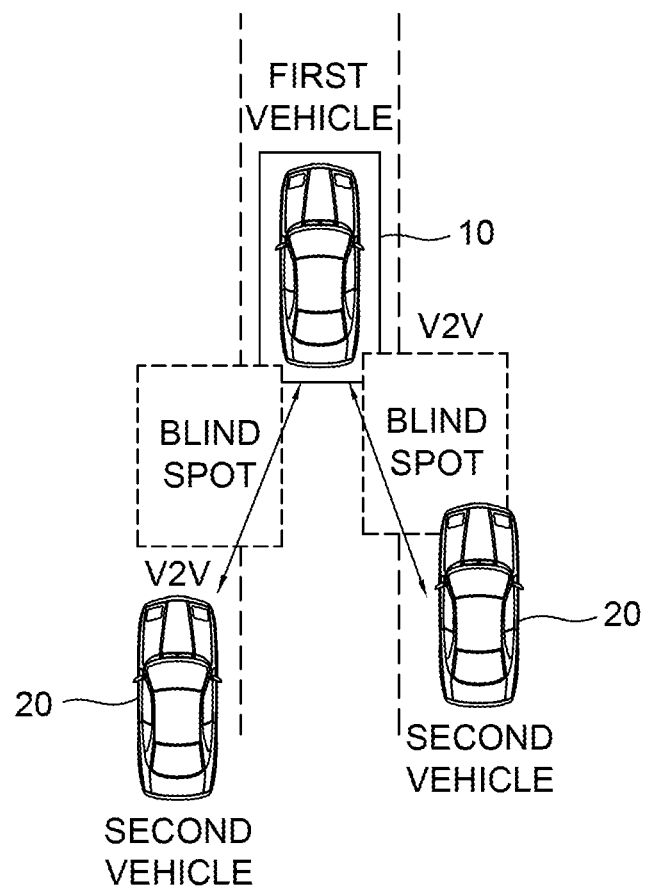
FIG. 3 is a drawing schematically illustrating a driving state of each of the vehicles with its blind-spot warning device, which is fluctuation-robust and fault-tolerant in the extreme situation, to give a warning on the blind spot by cooperation with the nearby vehicles based on the V2V communication in accordance with one example embodiment of the present disclosure.

Next, by referring to FIG. 3, while a first vehicle 10 and second vehicles 20 which are the nearby vehicles near the first vehicle 10 are traveling, the first vehicle 10 and the second vehicles 20 may monitor their blind spots at rear areas via each of the blind-spot warning devices, and may determine whether any of the nearby vehicles is located in the respective blind spots of the first vehicle and the second vehicles, to thereby allow safe driving by warning their drivers.

Also, each of the blind-spot warning devices of the first vehicle 10 and the second vehicles 20 may transmit its location information to the nearby vehicles, and each of the blind-spot warning devices, which received the location information of its nearby vehicles, of each of the vehicles may confirm whether its nearby vehicles are located in its blind spots using the location information of its nearby vehicles, to thereby allow safe driving by warning its driver.

In addition to this, each of the blind-spot warning devices of each of the vehicles 10 and 20 may detect locations of the nearby vehicles in front, may determine whether each vehicle corresponding to said each of the blind-spot warning devices is located in the blind spots of the nearby vehicles, and may transmit information on whether said each vehicle is located in the blind spots of the nearby vehicles to the nearby vehicles via the V2V communication part. Then, each of the blind-spot warning devices of each of the nearby vehicles in front which received the information on whether the nearby vehicles are located in the blind spots of its vehicle via the V2V communication part may warn its driver of a fact that the nearby vehicles are located in its blind spots, to thereby allow safe driving.

Figure 4:
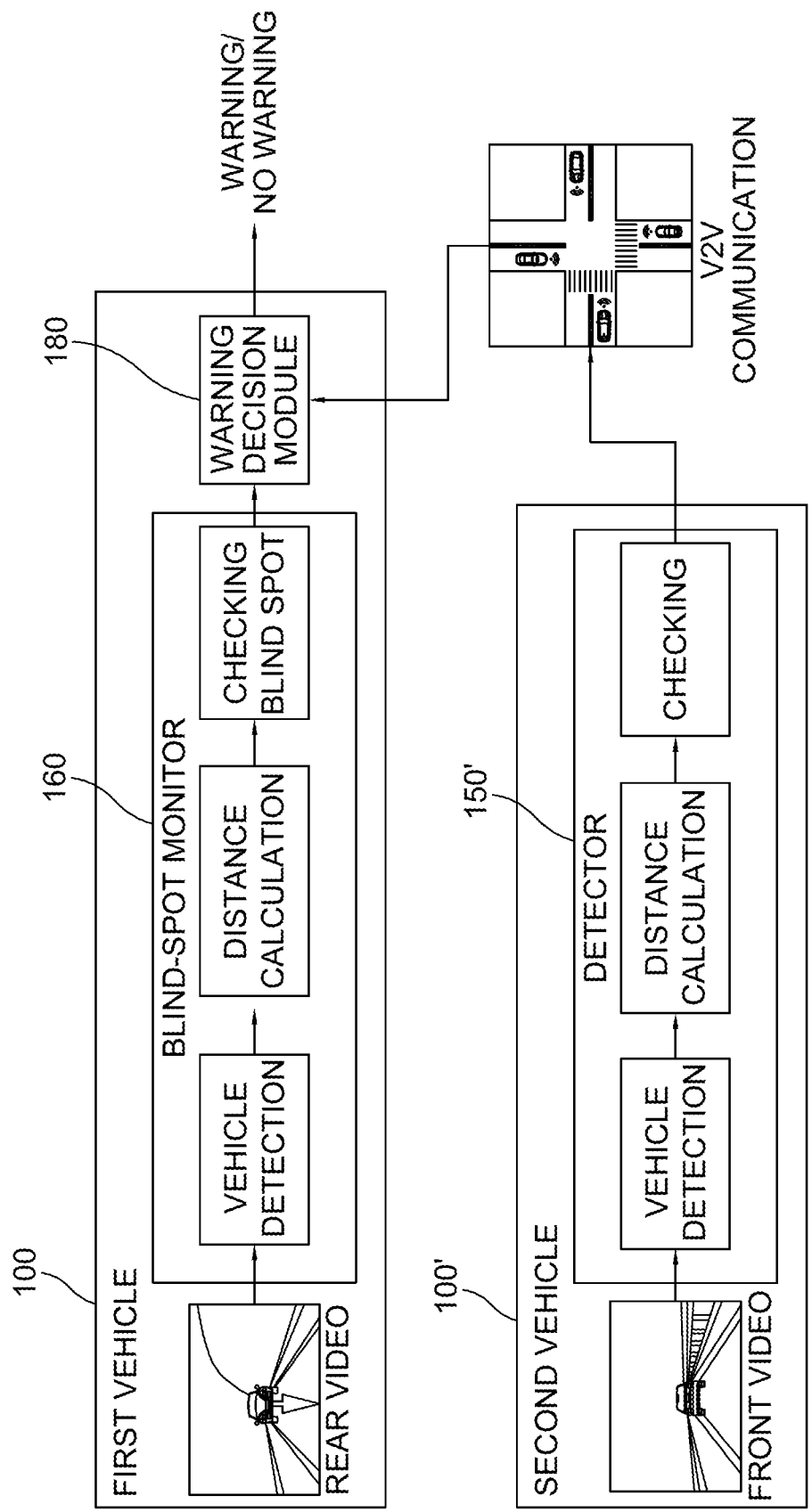
FIG. 4 is a drawing schematically illustrating a method, which is fluctuation-robust and fault-tolerant in the extreme situation, for giving a warning on the blind spot by cooperation with the nearby vehicles based on the V2V communication in accordance with one example embodiment of the present disclosure.
Figure 5:
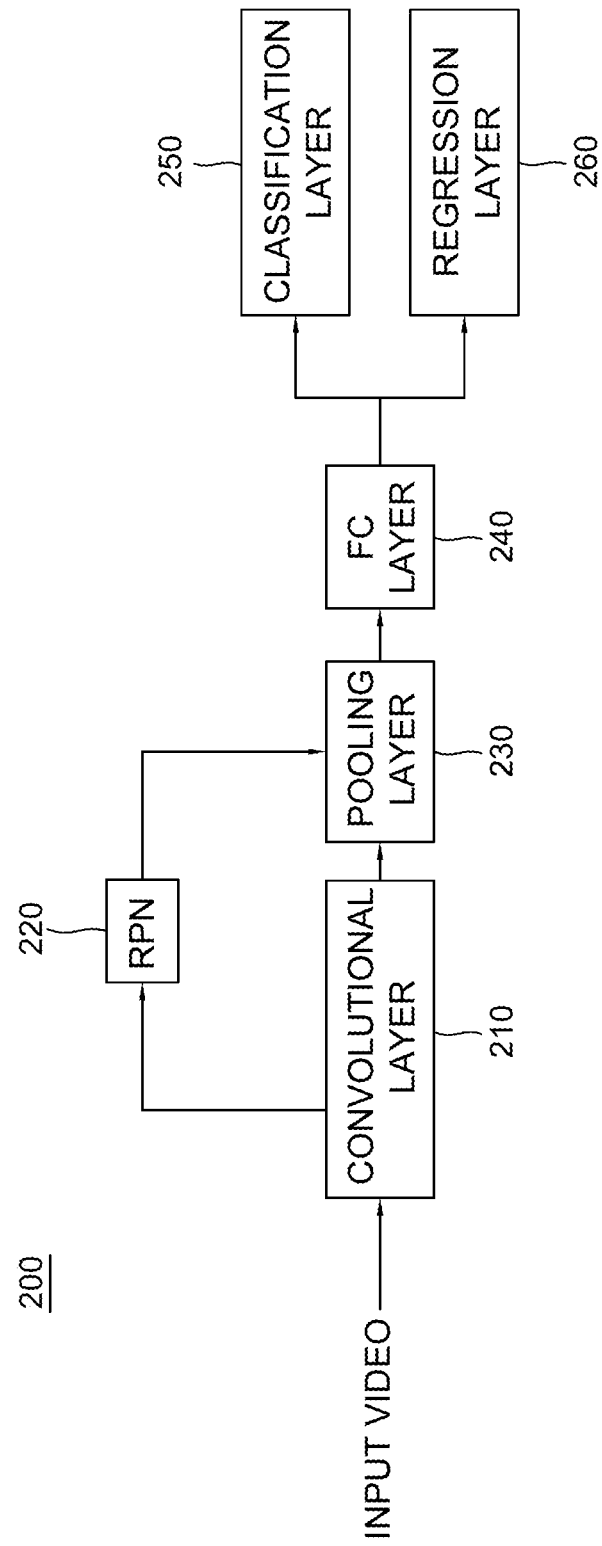
FIG. 5 is a drawing schematically illustrating the blind-spot warning device and a process of a detector detecting a vehicle, in the method, which is fluctuation-robust and fault-tolerant in an extreme situation, for giving a warning on the blind spot by cooperation with the nearby vehicles based on the V2V communication in accordance with one example embodiment of the present disclosure.

Operations of the blind-spot warning devices as such are described in detail by referring to FIGS. 3 to 5.

First, while the first vehicle and the second vehicles which are among the nearby vehicles near the first vehicle are traveling as in FIG. 3, the blind-spot warning device 100 of the first vehicle may acquire or support another device to acquire the rear video from the rear camera which monitors a rear area of the first vehicle.

And, the blind-spot warning device 100 of the first vehicle may instruct the blind-spot monitor 160 to monitor the blind spots by using the rear video.

Herein, if the rear video is acquired, the blind-spot monitor 160 may detect the nearby vehicles, i.e., the second vehicles in FIG. 3, located in the rear video. Herein, for detection of the nearby vehicles in the rear video, object detectors such as R-CNN (Region proposal Convolutional Neural Network), Fast R-CNN, etc. may be used, but the scope of the present disclosure is not limited thereto.

That is, if the rear video of the first vehicle is acquired from the rear camera monitoring the rear area of the first vehicle, a first blind-spot warning device 100 of the first vehicle may perform a process of transmitting the rear video of the first vehicle to the blind-spot monitor 160, to thereby allow the blind-spot monitor 160 to determine whether one or more nearby vehicles are shown in the rear video of the first vehicle by analyzing the rear video of the first vehicle based on a convolutional neural network, and thus to output first blind-spot monitoring information which is a result of determining whether at least one of the nearby vehicles shown in the rear video of the first vehicle is located in a first blind spot of the first vehicle.

As one example, by referring to FIG. 5, the first blind-spot warning device may transmit the rear video of the first vehicle to the blind-spot monitor.

Then, the blind-spot monitor may input the rear video into a convolutional layer 210, i.e., a second convolutional layer, to thereby allow the convolutional layer 210, i.e., the second convolutional layer, to generate a rear video feature map by applying convolution operation to the rear video, and may input the rear video feature map into a region proposal network 220, i.e., a second region proposal network, to thereby allow the region proposal network 220, i.e., the second region proposal network, to generate second proposal boxes corresponding to second objects on the rear video feature map. And, the blind-spot monitor may input the rear video feature map into a pooling layer 230, i.e., a second pooling layer, to thereby allow the pooling layer 230, i.e., the second pooling layer, to generate a rear video feature vector by applying pooling operation to one or more regions, corresponding to the second proposal boxes, on the rear video feature map, and may input the rear video feature vector into a fully connected layer 240, i.e., a second fully connected layer, to thereby allow the fully connected layer 240, i.e., the second fully connected layer, to apply fully-connected operation to the rear video feature vector. Next, the blind-spot monitor may input an output from the fully connected layer 240, i.e., the second fully connected layer, respectively into a classification layer 250, i.e., a second classification layer, and a regression layer 260, i.e., a second regression layer, to thereby allow the second classification layer and the second regression layer to respectively output second class information and second regression information on each of second objects corresponding to each of the second proposal boxes, and thus to detect at least one of the second vehicle and the nearby vehicles located in the rear video by referring to the second class information and the second regression information on each of the second objects.

Meanwhile, the blind-spot monitor 160 may have been learned by the learning device, in order to detect the nearby vehicles located in an input video, and the learning device and the learning method will be described later.

By referring to FIG. 4, the blind-spot monitor 160 may calculate each of distances between each of the detected nearby vehicles and the first vehicle, and confirm whether any of the detected nearby vehicles is located in the first blind spot of the first vehicle.

As one example, the blind-spot monitor 160 may determine whether the nearby vehicles are located in the first blind spot of the first vehicle by referring to longitudinal distances and lateral distances between the first vehicle and each of the detected nearby vehicles. That is, if the first blind spot of the first vehicle is set as areas of 3m×3m on both sides of the rear area of the first vehicle, then the nearby vehicles, whose longitudinal distances are less than 3m and whose lateral distances minus a half of a width of the vehicle are less than 3m, may be determined as located in the first blind spot of the first vehicle. Also, whether the first blind spot where the nearby vehicles are located is on a left side or right side of the first vehicle may be determined by referring to whether the lateral distances are positive or negative.

Then, the blind-spot warning device 100 of the first vehicle may instruct the warning decision module 180 to output a warning if any of the nearby vehicles is determined as located in the first blind spot of the first vehicle, to thereby let the driver of the first vehicle be aware of a fact that the nearby vehicles are located in the first blind spot of the first vehicle, for safe driving.

Next, the blind-spot warning device 100 of the first vehicle may receive the location information on the second vehicle via the V2V communication part, and if the received location information on the second vehicle is confirmed as corresponding to the first blind spot of the first vehicle, may warn the driver of the first vehicle of a fact that the second vehicle is located in the first blind spot of the first vehicle, for safe driving.

That is, if second blind-spot monitoring information, which is a result of determining whether the second vehicle is located in the first blind spot of the first vehicle, is acquired from the second blind-spot warning device 100' of the second vehicle located in the rear area of the first vehicle, over the vehicle to vehicle communication, the first blind-spot warning device 100 of the first vehicle may perform a process of giving a warning that at least one of the second vehicle and the nearby vehicles is located in the first blind spot by referring to the first blind-spot monitoring information and the second blind-spot monitoring information.

Herein, the first blind-spot warning device 100 of the first vehicle may perform a process of giving a warning that at least one of the second vehicle and the nearby vehicles is located in the first blind spot by referring to at least part of the first blind-spot monitoring information and the second blind-spot monitoring information, in response to driving environment information on the first vehicle. Therefore, even in case of water-drops, etc. on the rear camera of the first vehicle, the blind-spot warning device 100 of the first vehicle may confirm the location information on the second vehicle via V2V (vehicle to vehicle) communication, to thereby give the warning on the blind spot.

Also, the first blind-spot warning device 100 of the first vehicle may perform a process of acquiring GPS location information on the second vehicle from the second blind-spot warning device 100' of the second vehicle over the V2V communication. And, if a GPS confidence value of the GPS location information on the second vehicle transmitted from the second vehicle is determined as valid, the first blind-spot warning device 100 may perform a process of giving a warning that the second vehicle is located in the first blind spot through determining whether the second vehicle is located in the first blind spot by referring to the GPS location information on the second vehicle, and if the GPS confidence value of the GPS location information on the second vehicle is determined as not valid, the first blind-spot warning device 100 may perform a process of giving a warning that at least one of the second vehicle and the nearby vehicles is located in the first blind spot by referring to the first blind-spot monitoring information and the second blind-spot monitoring information.

Meanwhile, the second blind-spot warning device 100' of the second vehicle may acquire or support another device to acquire the front video from the front camera.

And, the second blind-spot warning device 100' of the second vehicle may instruct a second detector 150' to detect the nearby vehicle in front of the second vehicle by using the front video thereof.

As one example, if the front video is acquired, the second detector 150' may detect the nearby vehicle, i.e., the first vehicle in FIG. 3, located in the front video. Herein, for detection of the nearby vehicle in the front video, object detectors such as the R-CNN (Region proposal Convolutional Neural Network), the Fast R-CNN, etc. may be used, but the scope of the present disclosure is not limited thereto.

Meanwhile, by referring to FIG. 5 again, the second blind-spot warning device of the second vehicle may transmit or support another device to transmit a second front video, acquired from a second front camera monitoring the front area of the second vehicle, to the second detector of the second vehicle.

Then, the second detector of the second vehicle may input the second front video into a convolutional layer 210, i.e., a third convolutional layer, to thereby allow the convolutional layer 210, i.e., the third convolutional layer, to generate a second front video feature map by applying convolution operation to the second front video, and may input the second front video feature map into a region proposal network 220, i.e., a third region proposal network, to thereby allow the region proposal network 220, i.e., the third region proposal network, to generate third proposal boxes corresponding to third objects on the second front video feature map. And, the second detector may input the second front video feature map into a pooling layer 230, i.e., a third pooling layer, to thereby allow the pooling layer 230, i.e., the third pooling layer, to generate a second front video feature vector by applying pooling operation to one or more regions, corresponding to the third proposal boxes, on the second front video feature map, and may input the second front video feature vector into a fully connected layer 240, i.e., a third fully connected layer, to thereby allow the fully connected layer 240, i.e., the third fully connected layer, to apply fully-connected operation to the second front video feature vector. Next, the second detector may input an output from the fully connected layer 240, i.e., the third fully connected layer, respectively into a classification layer 250, i.e., a third classification layer, and a regression layer 260, i.e., a third regression layer, to thereby allow the third classification layer and the third regression layer to respectively output third class information and third regression information on each of third objects corresponding to each of the third proposal boxes, and thus to detect the first vehicle located in the second front video by referring to the third class information and the third regression information on each of the third objects.

By referring to FIG. 4, the second detector 150' of the second vehicle may calculate each of distances between the nearby vehicle and the second vehicle, and determine whether the second vehicle is located in the blind spots of the nearby vehicle. That is, a distance between the first vehicle and the second vehicle may be calculated, and whether the second vehicle is located in the first blind spot of the first vehicle may be determined.

That is, the second detector 150' may generate the second blind-spot monitoring information representing whether the second vehicle is located in the first blind spot of the detected first vehicle.

Herein, the second detector 150' may determine whether the second vehicle is located in the first blind spot of the first vehicle by referring to each longitudinal distance and each lateral distance between the detected first vehicle and the second vehicle.

Meanwhile, the second detector 150' may have been learned by the learning device to detect the nearby vehicles located in the input video, and the learning device and the learning method will be described later.

Thereafter, if the second vehicle is determined as located in the blind spots of the nearby vehicle, the blind-spot warning device 100' of the second vehicle may transmit information, representing that the second vehicle is located in the blind spots of the nearby vehicle, to the nearby vehicle via the V2V communication part. That is, if the second vehicle is determined as located in the first blind spot of the first vehicle, the blind-spot warning device 100' of the second vehicle may transmit the information, representing that the second vehicle is located in the first blind spot of the first vehicle, to the first vehicle via the V2V communication part.

Then, the nearby vehicle which received the information, i.e., the blind-spot warning device 100 of the first vehicle in FIG. 3, may warn the driver of the first vehicle by using a fact that the second vehicle is located in the blind spots of the first vehicle according to the warning decision module 180, for safe driving.

As a result, safe driving is possible because information on the blind spots of the nearby vehicles can be acquired even when the vehicles are between tall buildings where position accuracy deteriorates, or in driving environments such as cloudy weather, tunnel, etc., while the position information of the vehicles using GPS is shared by the V2V communication.

Also, safe driving is possible because information on the blind spots of the nearby vehicles can be acquired even when at least one lens of the rear camera has dust, water-drops, etc. on it.

In addition to this, even in case that object detection performance based on the rear image is low due to low illumination in nighttime without headlights in the rear of the vehicle, the accurate blind-spot warning can be provided using the front images acquired from the front cameras of the nearby vehicles.

Meanwhile, the blind-spot warning device 100 may instruct its warning decision module 180 to determine the warning on the blind spot according to the driving environment.

As one example, if the GPS confidence value is determined as valid, distances between the vehicles may be calculated by using GPS information on the nearby vehicles via V2V communication, and whether to give the warning on the blind spot may be determined by referring to the calculated distances.

But, if the GPS confidence value is determined as invalid, distances between the vehicles may be calculated by using cameras and whether to give the warning on the blind spot may be determined by referring to the calculated distances shared via the V2V communication.

Also, whether to give the warning on the blind spot may be determined according to the driving information on the vehicles. That is, while traveling in normal illumination like daytime and fair weather, the warning on the blind spot may be given by referring to results of the blind-spot detector 160 using the rear camera, and while traveling in low illumination like nighttime and rainy weather, the warning on the blind spot may be given by referring to results of the detector 150' using the front camera transmitted from the nearby vehicles via the V2V communication.

As described above, the present disclosure provides fluctuation-robust and fault-tolerant blind-spot detection by V2V information fusion of blind-spot information from the nearby vehicles transmitted via V2V communication in the extreme situation, to thereby allow safe driving by giving the warning on the blind spot with functional safety.

Next, by referring to FIG. 2, if a first front video of the first vehicle is acquired from the first front camera 101 monitoring the front area of the first vehicle, the first blind-spot warning device 100 of the first vehicle may perform a process of transmitting the first front video to a first detector 150 of the first vehicle, to thereby allow the first detector 150 to detect a third vehicle located in the front area of the first vehicle by analyzing the first front video based on the convolutional neural network, and thus to transmit third blind-spot monitoring information, which is a result of determining whether the first vehicle is located in a third blind spot of the detected third vehicle, to the third vehicle over the V2V communication. Herein, the blind-spot warning device 100 of the first vehicle may perform, independently of any temporal order, a process of generating third blind-spot monitoring information representing whether the first vehicle is located in the third blind spot of the third vehicle by using the first front video from the first front camera 101 and a process of generating the first blind-spot monitoring information representing whether at least one of the second vehicle and the nearby vehicles is located in the first blind spot of the first vehicle by using the rear video from the rear camera 102 of the first vehicle.

As one example, by referring to FIG. 5, the first blind-spot warning device of the first vehicle may transmit the first front video, acquired from the first front camera, to the first detector.

Then, the first detector may input the first front video into a convolutional layer 210, i.e., a first convolutional layer, to thereby allow the convolutional layer 210, i.e., a first convolutional layer, to generate a first front video feature map by applying convolution operation to the first front video, and may input the first front video feature map into a region proposal network 220, i.e., a first region proposal network, to thereby allow the region proposal network 220, i.e., the first region proposal network, to generate first proposal boxes corresponding to first objects on the first front video feature map. And, the first detector may input the first front video feature map into a pooling layer 230, i.e., a first pooling layer, to thereby allow the pooling layer 230, i.e., the first pooling layer, to generate a first front video feature vector by applying pooling operation to one or more regions, corresponding to the first proposal boxes, on the first front video feature map, and may input the first front video feature vector into a fully connected layer 240, i.e., a first fully connected layer, to thereby allow the fully connected layer 240, i.e., the first fully connected layer, to apply fully-connected operation to the first front video feature vector. Next, the first detector may input an output from the fully connected layer 240, i.e., the first fully connected layer, respectively into a classification layer 250, i.e., a first classification layer, and a regression layer 260, i.e., a first regression layer, to thereby allow the first classification layer and the first regression layer to respectively output the first class information and the first regression information on each of the first objects corresponding to each of the first proposal boxes, and thus to detect the third vehicle located in the first front video by referring to the first class information and the first regression information on each of the first objects.

Meanwhile, the first detector 150 may have been learned by the learning device to detect the nearby vehicles located in the video, and the learning device and the learning method will be described later.

And, the first detector 150 may calculate a distance between the first vehicle and the detected third vehicle, and then generate the third blind-spot monitoring information representing whether the first vehicle is located in the third blind spot of the third vehicle.

Figure 6:
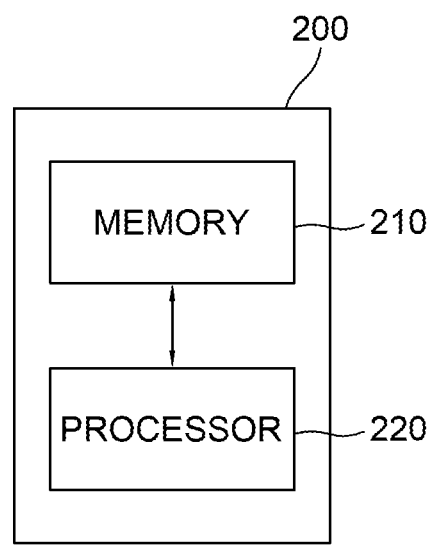
FIG. 6 is a drawing schematically illustrating a learning device for learning the detector and the blind-spot warning device, which is fluctuation-robust and fault-tolerant in an extreme situation, for giving a warning on the blind spot by cooperation with the nearby vehicles based on the V2V communication in accordance with one example embodiment of the present disclosure.

FIG. 6 is a drawing schematically illustrating the learning device 200 for learning the detector and the blind-spot warning device, which is fluctuation-robust and fault-tolerant in an extreme situation, for giving a warning on the blind spot by cooperation with the nearby vehicles based on the V2V communication in accordance with one example embodiment of the present disclosure. The learning device 200 may include a memory 210 for storing instructions to detect vehicles from the input video, and a processor 220 for performing processes to learn the first detector and the blind-spot monitor of the first blind-spot warning device 100, and learn the second detector of the second blind-spot warning device according to the instructions in the memory 210. Herein, although not described above, it should be noted that the blind-spot monitor of the second blind-spot warning device is not excluded.

Specifically, the learning device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 7:
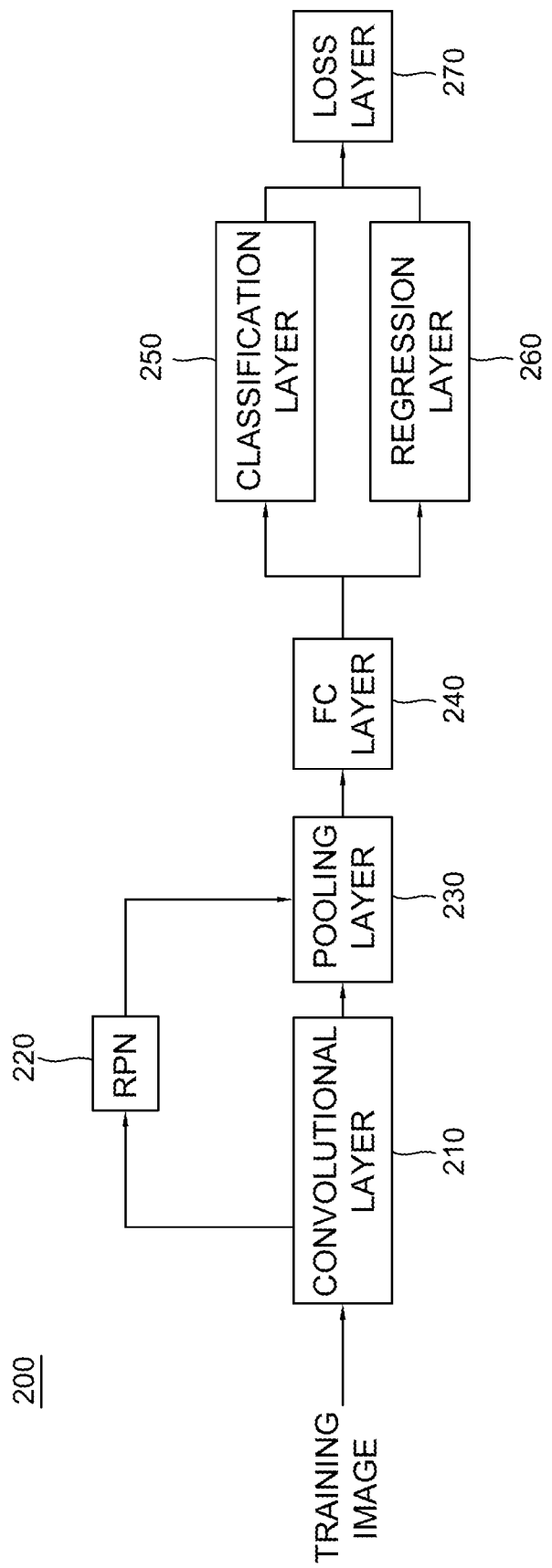
FIG. 7 is a drawing schematically illustrating a learning method for learning the detector and the blind-spot warning device, which is fluctuation-robust and fault-tolerant in an extreme situation, for giving a warning on the blind spot by cooperation with the nearby vehicles based on the V2V communication in accordance with one example embodiment of the present disclosure.

A method for learning the detector and the blind-spot monitor for detecting vehicles from the input video by using the learning device 200 in accordance with one example embodiment of the present disclosure is described by referring to FIG. 7 as follows. Hereinafter, the blind-spot monitor and the detector are not distinguished from each other.

First, if at least one training image corresponding to the front video from the front camera and the rear video from the rear camera of a vehicle is acquired, the learning device 200 may input the training image into a convolutional layer, to thereby allow the convolutional layer to generate a feature map for training by applying convolution operation to the training image.

And, the learning device 200 may input the feature map for training, generated by the convolutional layer 210, into the region proposal network 220, to thereby allow the region proposal network 220 to generate proposal boxes for training corresponding to objects for training on the feature map for training, and may input the feature map for training into the pooling layer 230, to thereby allow the pooling layer 230 to generate a feature vector for training by applying pooling operation to regions, corresponding to the proposal boxes for training, on the feature map for training.

Thereafter, the learning device 200 may input the feature vector for training generated by the pooling layer 230 into the fully connected layer 240, to thereby allow the fully connected layer 240 to apply fully-connected operation to the feature vector for training, and may input an output for training from the fully connected layer 240 respectively into the classification layer 250 and the regression layer 260, to thereby allow the classification layer 250 and the regression layer 260 to respectively generate class information for training and regression information for training on each of objects for training corresponding to each of the proposal boxes for training.

Next, the learning device 200 may allow at least one loss layer 270 to calculate one or more losses by referring to the class information for training and the regression information for training and their respective corresponding GTs, and may learn the detector and the blind-spot monitor of the blind-spot warning device by updating at least one parameter of at least one of the fully connected layer 240 and the convolutional layer 210 via backpropagation using the losses.

The present disclosure has an effect of giving the accurate warning on the blind spot without regard to the driving environment, by using blind-spot detection by itself and receiving whether the nearby vehicles enter into the blind spots of its own via the V2V communication.

The present disclosure has another effect of giving the accurate warning on the blind spot even when the lens of the rear camera is contaminated, by using the blind-spot detection by itself and receiving whether the nearby vehicles enter into the blind spots of its own via the V2V communication.

The present disclosure has still another effect of giving the accurate warning on the blind spot in nighttime, by using the blind-spot detection by itself and receiving whether the nearby vehicles enter into the blind spots of its own via the V2V communication.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for giving a warning on a blind spot of a vehicle based on vehicle to vehicle communication, comprising steps of:
(a) if a rear video of a first vehicle is acquired from a rear camera monitoring a rear area of the first vehicle, a first blind-spot warning device of the first vehicle performing a process of transmitting the rear video of the first vehicle to a blind-spot monitor, to thereby allow the blind-spot monitor to determine whether one or more nearby vehicles are shown in the rear video of the first vehicle by analyzing the rear video of the first vehicle based on a convolutional neural network, and thus to output first blind-spot monitoring information which is a result of determining whether at least one of the nearby vehicles shown in the rear video of the first vehicle is located in a first blind spot of the first vehicle;

(b) if second blind-spot monitoring information, which is a result of determining whether a second vehicle is located in the first blind spot of the first vehicle, is acquired from a second blind-spot warning device of the second vehicle located in the rear area of the first vehicle, over the vehicle to vehicle communication, the first blind-spot warning device performing a process of giving a warning that at least one of the second vehicle and the nearby vehicles is located in the first blind spot by referring to the first blind-spot monitoring information and the second blind-spot monitoring information; and (c) if a first front video of the first vehicle is acquired from a first front camera monitoring a front area of the first vehicle, the first blind-spot warning device performing a process of transmitting the first front video to a first detector of the first vehicle, to thereby allow the first detector to detect a third vehicle located in the front area of the first vehicle by analyzing the first front video based on the convolutional neural network, and thus to transmit third blind-spot monitoring information, which is a result of determining whether the first vehicle is located in a third blind spot of the detected third vehicle, to the third vehicle over the vehicle to vehicle communication, wherein the first blind-spot warning device performs a process of transmitting the first front video to the first detector to allow the first detector to (i) input the first front video into a first convolutional layer, to thereby allow the first convolutional layer to generate a first front video feature map by applying convolution operation to the first front video, (ii) input the first front video feature map into a first region proposal network, to thereby allow the first region proposal network to generate first proposal boxes corresponding to first objects on the first front video feature map, (iii) input the first front video feature map into a first pooling layer, to thereby allow the first pooling layer to generate a first front video feature vector by applying pooling operation to one or more regions, corresponding to the first proposal boxes, on the first front video feature map, (iv) input the first front video feature vector into a first fully connected layer, to thereby allow the first fully connected layer to apply fully-connected operation to the first front video feature vector, and (v) input an output from the first fully connected layer respectively into a first classification layer and a first regression layer, to thereby allow the first classification layer and the first regression layer to respectively output first class information and first regression information on each of the first proposal boxes, and thus to detect the third vehicle located in the first front video by referring to the first class information and the first regression information on each of the first objects.

2. The method of claim 1, wherein the first detector has been learned by a learning device performing (i) a process of inputting a training image into the first convolutional layer, to thereby allow the first convolutional layer to generate at least one feature map for training by applying convolution operation to the training image, (ii) a process of inputting the feature map for training into the first region proposal network, to thereby allow the first region proposal network to generate one or more proposal boxes for training corresponding to one or more objects for training on the feature map for training, (iii) a process of inputting the feature map for training into the first pooling layer, to thereby allow the first pooling layer to generate at least one feature vector for training by applying pooling operation to one or more regions, corresponding to the proposal boxes for training, on the feature map for training, (iv) a process of inputting the feature vector for training into the first fully connected layer, to thereby allow the first fully connected layer to apply fully-connected operation to the feature vector for training, (v) a process of inputting at least one output for training from the first fully connected layer respectively into the first classification layer and the first regression layer, to thereby allow the first classification layer and the first regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the first fully connected layer and the first convolutional layer by back-propagating the losses.

3. The method of claim 1, wherein the first blind-spot warning device performs a process of determining whether the first vehicle is located in the third blind spot by referring to a longitudinal distance and a lateral distance between the first vehicle and the third vehicle.

4. The method of claim 1, wherein the first blind-spot warning device further performs a process of transmitting GPS location information on the first vehicle to the third vehicle over the vehicle to vehicle communication.

5. The method of claim 1, wherein, at the step of (a), the first blind-spot warning device performs a process of transmitting the rear video to the blind-spot monitor to allow the blind-spot monitor to (i) input the rear video into a second convolutional layer, to thereby allow the second convolutional layer to generate a rear video feature map by applying convolution operation to the rear video, (ii) input the rear video feature map into a second region proposal network, to thereby allow the second region proposal network to generate second proposal boxes corresponding to second objects on the rear video feature map, (iii) input the rear video feature map into a second pooling layer, to thereby allow the second pooling layer to generate a rear video feature vector by applying pooling operation to one or more regions, corresponding to the second proposal boxes, on the rear video feature map, (iv) input the rear video feature vector into a second fully connected layer, to thereby allow the second fully connected layer to apply fully-connected operation to the rear video feature vector, and (v) input an output from the second fully connected layer respectively into a second classification layer and a second regression layer, to thereby allow the second classification layer and the second regression layer to respectively output second class information and second regression information on each of the second objects corresponding to each of the second proposal boxes, and thus to detect the nearby vehicles located in the rear video by referring to the second class information and the second regression information on each of the second objects.

6. The method of claim 5, wherein the blind-spot monitor has been learned by a learning device performing (i) a process of inputting a training image into the second convolutional layer, to thereby allow the second convolutional layer to generate a feature map for training by applying convolution operation to the training image, (ii) a process of inputting the feature map for training into the second region proposal network, to thereby allow the second region proposal network to generate proposal boxes for training corresponding to objects for training on the feature map for training, (iii) a process of inputting the feature map for training into the second pooling layer, to thereby allow the second pooling layer to generate a feature vector for training by applying pooling operation to one or more regions, corresponding to proposal boxes for training, on the feature map for training, (iv) a process of inputting the feature vector for training into the second fully connected layer, to thereby allow the second fully connected layer to apply fully-connected operation to the feature vector for training, (v) a process of inputting an output for training from the second fully connected layer respectively into the second classification layer and the second regression layer, to thereby allow the second classification layer and the second regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the second fully connected layer and the second convolutional layer by backpropagating the losses.

7. The method of claim 1, wherein, at the step of (a), the first blind-spot warning device performs a process of transmitting the rear video to the blind-spot monitor, to thereby allow the blind-spot monitor to determine whether the nearby vehicles are located in the first blind spot by referring to longitudinal distances and lateral distances between the first vehicle and each of the nearby vehicles detected.

8. The method of claim 1, wherein, at the step of (b), the first blind-spot warning device performs a process of giving a warning that at least one of the second vehicle and the nearby vehicles is located in the first blind spot by referring to at least part of the first blind-spot monitoring information and the second blind-spot monitoring information, in response to driving environment information on the first vehicle.

9. The method of claim 1, wherein, at the step of (b), the first blind-spot warning device performs a process of acquiring GPS location information on the second vehicle from the second blind-spot warning device over the vehicle to vehicle communication,
wherein, if a GPS confidence value of the GPS location information on the second vehicle is determined as valid, the first blind-spot warning device performs a process of giving a warning that the second vehicle is located in the first blind spot through determining whether the second vehicle is located in the first blind spot by referring to the GPS location information on the second vehicle, and
wherein, if the GPS confidence value of the GPS location information on the second vehicle is determined as not valid, the first blind-spot warning device performs a process of giving a warning that at least one of the second vehicle and the nearby vehicles is located in the first blind spot by referring to the first blind-spot monitoring information and the second blind-spot monitoring information.

10. The method of claim 1, wherein, at the step of (b), the second blind-spot warning device performs a process of transmitting a second front video, acquired from a second front camera monitoring a front area of the second vehicle, to a second detector of the second vehicle to allow the second detector to (i) input the second front video into a third convolutional layer, to thereby allow the third convolutional layer to generate a second front video feature map by applying convolution operation to the second front video, (ii) input the second front video feature map into a third region proposal network, to thereby allow the third region proposal network to generate third proposal boxes corresponding to third objects on the second front video feature map, (iii) input the second front video feature map into a third pooling layer, to thereby allow the third pooling layer to generate a second front video feature vector by applying pooling operation to one or more regions, corresponding to the third proposal boxes, on the second front video feature map, (iv) input the second front video feature vector into a third fully connected layer, to thereby allow the third fully connected layer to apply fully-connected operation to the second front video feature vector, and (v) input an output from the third fully connected layer respectively into a third classification layer and a third regression layer, to thereby allow the third classification layer and the third regression layer to respectively output third class information and third regression information on each of the third objects corresponding to each of the third proposal boxes, and thus to detect the first vehicle located in the second front video by referring to the third class information and the third regression information on each of the third objects, and as a result, a process of generating the second blind-spot monitoring information representing whether the second vehicle is located in the first blind spot of the detected first vehicle.

11. The method of claim 10, wherein the second detector has been learned by a learning device performing (i) a process of inputting a training image into the third convolutional layer, to thereby allow the third convolutional layer to generate a feature map for training by applying convolution operation to the training image, (ii) a process of inputting the feature map for training into the third region proposal network, to thereby allow the third region proposal network to generate proposal boxes for training corresponding to objects for training on the feature map for training, (iii) a process of inputting the feature map for training into the third pooling layer, to thereby allow the third pooling layer to generate a feature vector for training by applying pooling operation to one or more regions, corresponding to proposal boxes for training, on the feature map for training, (iv) a process of inputting the feature vector for training into the third fully connected layer, to thereby allow the third fully connected layer to apply fully-connected operation to the feature vector for training, (v) a process of inputting an output for training from the third fully connected layer respectively into the third classification layer and the third regression layer, to thereby allow the third classification layer and the third regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the third fully connected layer and the third convolutional layer by backpropagating the losses.

12. A first blind-spot warning device of a first vehicle for giving a warning on a blind spot of a vehicle based on vehicle to vehicle communication, comprising:
at least one memory that stores instructions; and at least one processor configured to execute the instructions to perform or support another device to perform:
(I) if a rear video of the first vehicle is acquired from a rear camera monitoring a rear area of the first vehicle, a process of transmitting the rear video of the first vehicle to a blind-spot monitor, to thereby allow the blind-spot monitor to determine whether one or more nearby vehicles are shown in the rear video of the first vehicle by analyzing the rear video of the first vehicle based on a convolutional neural network, and thus to output first blind-spot monitoring information which is a result of determining whether at least one of the nearby vehicles shown in the rear video of the first vehicle is located in a first blind spot of the first vehicle;
(II) if second blind-spot monitoring information, which is a result of determining whether a second vehicle is located in the first blind spot of the first vehicle, is acquired from a second blind-spot warning device of the second vehicle located in the rear area of the first vehicle, over the vehicle to vehicle communication, a process of giving a warning that at least one of the second vehicle and the nearby vehicles is located in the first blind spot by referring to the first blind-spot monitoring information and the second blind-spot monitoring information; and
(III) if a first front video of the first vehicle is acquired from a first front camera monitoring a front area of the first vehicle, a process of transmitting the first front video to a first detector of the first vehicle, to thereby allow the first detector to detect a third vehicle located in the front area of the first vehicle by analyzing the first front video based on the convolutional neural network, and thus to transmit third blind-spot monitoring information, which is a result of determining whether the first vehicle is located in a third blind spot of the detected third vehicle, to the third vehicle over the vehicle to vehicle communication;
wherein the processor performs a process of transmitting the first front video to the first detector to allow the first detector to
(i) input the first front video into a first convolutional layer, to thereby allow the first convolutional layer to generate a first front video feature map by applying convolution operation to the first front video,
(ii) input the first front video feature map into a first region proposal network, to thereby allow the first region proposal network to generate first proposal boxes corresponding to first objects on the first front video feature map,
(iii) input the first front video feature map into a first pooling layer, to thereby allow the first pooling layer to generate a first front video feature vector by applying pooling operation to one or more regions, corresponding to the first proposal boxes, on the first front video feature map,
(iv) input the first front video feature vector into a first fully connected layer, to thereby allow the first fully connected layer to apply fully-connected operation to the first front video feature vector, and
(v) input an output from the first fully connected layer respectively into a first classification layer and a first regression layer, to thereby allow the first classification layer and the first regression layer to respectively output first class information and first regression information on each of the first objects corresponding to each of the first proposal boxes, and thus to detect the third vehicle located in the first front video by referring to the first class information and the first regression information on each of the first objects.

13. The first blind-spot warning device of the first vehicle of claim 12, wherein the first detector has been learned by a learning device performing (i) a process of inputting a training image into the first convolutional layer, to thereby allow the first convolutional layer to generate at least one feature map for training by applying convolution operation to the training image, (ii) a process of inputting the feature map for training into the first region proposal network, to thereby allow the first region proposal network to generate one or more proposal boxes for training corresponding to one or more objects for training on the feature map for training, (iii) a process of inputting the feature map for training into the first pooling layer, to thereby allow the first pooling layer to generate at least one feature vector for training by applying pooling operation to one or more regions, corresponding to the proposal boxes for training, on the feature map for training, (iv) a process of inputting the feature vector for training into the first fully connected layer, to thereby allow the first fully connected layer to apply fully-connected operation to the feature vector for training, (v) a process of inputting at least one output for training from the first fully connected layer respectively into the first classification layer and the first regression layer, to thereby allow the first classification layer and the first regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the first fully connected layer and the first convolutional layer by backpropagating the losses.

14. The first blind-spot warning device of the first vehicle of claim 12, wherein the processor performs a process of determining whether the first vehicle is located in the third blind spot by referring to a longitudinal distance and a lateral distance between the first vehicle and the third vehicle.

15. The first blind-spot warning device of the first vehicle of claim 12, wherein the processor further performs a process of transmitting GPS location information on the first vehicle to the third vehicle over the vehicle to vehicle communication.

16. The first blind-spot warning device of the first vehicle of claim 12, wherein, at the process of (I), the processor performs a process of transmitting the rear video to the blind-spot monitor to allow the blind-spot monitor to (i) input the rear video into a second convolutional layer, to thereby allow the second convolutional layer to generate a rear video feature map by applying convolution operation to the rear video, (ii) input the rear video feature map into a second region proposal network, to thereby allow the second region proposal network to generate second proposal boxes corresponding to second objects on the rear video feature map, (iii) input the rear video feature map into a second pooling layer, to thereby allow the second pooling layer to generate a rear video feature vector by applying pooling operation to one or more regions, corresponding to the second proposal boxes, on the rear video feature map, (iv) input the rear video feature vector into a second fully connected layer, to thereby allow the second fully connected layer to apply fully-connected operation to the rear video feature vector, and (v) input an output from the second fully connected layer respectively into a second classification layer and a second regression layer, to thereby allow the second classification layer and the second regression layer to respectively output second class information and second regression information on each of the second objects corresponding to each of the second proposal boxes, and thus to detect the nearby vehicles located in the rear video by referring to the second class information and the second regression information on each of the second objects.

17. The first blind-spot warning device of the first vehicle of claim 16, wherein the blind-spot monitor has been learned by a learning device performing (i) a process of inputting a training image into the second convolutional layer, to thereby allow the second convolutional layer to generate a feature map for training by applying convolution operation to the training image, (ii) a process of inputting the feature map for training into the second region proposal network, to thereby allow the second region proposal network to generate proposal boxes for training corresponding to objects for training on the feature map for training, (iii) a process of inputting the feature map for training into the second pooling layer, to thereby allow the second pooling layer to generate a feature vector for training by applying pooling operation to one or more regions, corresponding to proposal boxes for training, on the feature map for training, (iv) a process of inputting the feature vector for training into the second fully connected layer, to thereby allow the second fully connected layer to apply fully-connected operation to the feature vector for training, (v) a process of inputting an output for training from the second fully connected layer respectively into the second classification layer and the second regression layer, to thereby allow the second classification layer and the second regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the second fully connected layer and the second convolutional layer by backpropagating the losses.

18. The first blind-spot warning device of the first vehicle of claim 12, wherein, at the process of (I), the processor performs a process of transmitting the rear video to the blind-spot monitor, to thereby allow the blind-spot monitor to determine whether the nearby vehicles are located in the first blind spot by referring to longitudinal distances and lateral distances between the first vehicle and each of the nearby vehicles detected.

19. The first blind-spot warning device of the first vehicle of claim 12, wherein, at the process of (II), the processor performs a process of giving a warning that at least one of the second vehicle and the nearby vehicles is located in the first blind spot by referring to at least part of the first blind-spot monitoring information and the second blind-spot monitoring information, in response to driving environment information on the first vehicle.

20. The first blind-spot warning device of the first vehicle of claim 12, wherein, at the process of (II), the processor performs a process of acquiring GPS location information on the second vehicle from the second blind-spot warning device over the vehicle to vehicle communication,
  wherein, if a GPS confidence value of the GPS location information on the second vehicle is determined as valid, the processor performs a process of giving a warning that the second vehicle is located in the first blind spot through determining whether the second vehicle is located in the first blind spot by referring to the GPS location information on the second vehicle, and
  wherein, if the GPS confidence value of the GPS location information on the second vehicle is determined as not valid, the processor performs a process of giving a warning that at least one of the second vehicle and the nearby vehicles is located in the first blind spot by referring to the first blind-spot monitoring information and the second blind-spot monitoring information.

21. The first blind-spot warning device of the first vehicle of claim 12, wherein, at the process of (II), the second blind-spot warning device performs a process of transmitting a second front video, acquired from a second front camera monitoring a front area of the second vehicle, to a second detector of the second vehicle to allow the second detector to (i) input the second front video into a third convolutional layer, to thereby allow the third convolutional layer to generate a second front video feature map by applying convolution operation to the second front video, (ii) input the second front video feature map into a third region proposal network, to thereby allow the third region proposal network to generate third proposal boxes corresponding to third objects on the second front video feature map, (iii) input the second front video feature map into a third pooling layer, to thereby allow the third pooling layer to generate a second front video feature vector by applying pooling operation to one or more regions, corresponding to the third proposal boxes, on the second front video feature map, (iv) input the second front video feature vector into a third fully connected layer, to thereby allow the third fully connected layer to apply fully-connected operation to the second front video feature vector, and (v) input an output from the third fully connected layer respectively into a third classification layer and a third regression layer, to thereby allow the third classification layer and the third regression layer to respectively output third class information and third regression information on each of the third objects corresponding to each of the third proposal boxes, and thus to detect the first vehicle located in the second front video by referring to the third class information and the third regression information on each of the third objects, and as a result, a process of generating the second blind-spot monitoring information representing whether the second vehicle is located in the first blind spot of the detected first vehicle.

22. The first blind-spot warning device of the first vehicle of claim 21, wherein the second detector has been learned by a learning device performing (i) a process of inputting a training image into the third convolutional layer, to thereby allow the third convolutional layer to generate a feature map for training by applying convolution operation to the training image, (ii) a process of inputting the feature map for training into the third region proposal network, to thereby allow the third region proposal network to generate proposal boxes for training corresponding to objects for training on the feature map for training, (iii) a process of inputting the feature map for training into the third pooling layer, to thereby allow the third pooling layer to generate a feature vector for training by applying pooling operation to one or more regions, corresponding to proposal boxes for training, on the feature map for training, (iv) a process of inputting the feature vector for training into the third fully connected layer, to thereby allow the third fully connected layer to apply fully-connected operation to the feature vector for training, (v) a process of inputting an output for training from the third fully connected layer respectively into the third classification layer and the third regression layer, to thereby allow the third classification layer and the third regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the third fully connected layer and the third convolutional layer by back-propagating the losses.

* * * * *